March 20, 1951    J. W. McCAUSLAND    2,545,701
COMPENSATED PIPE EXPANSION JOINT
Filed Nov. 29, 1946
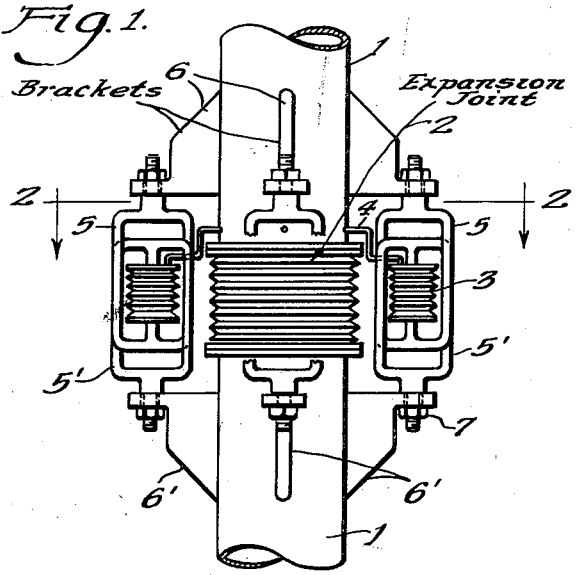
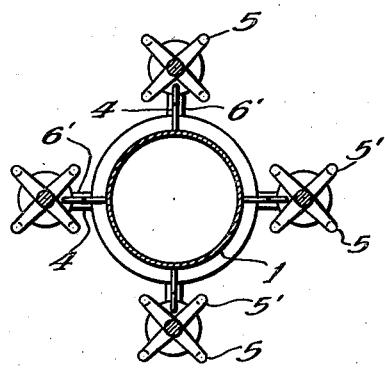
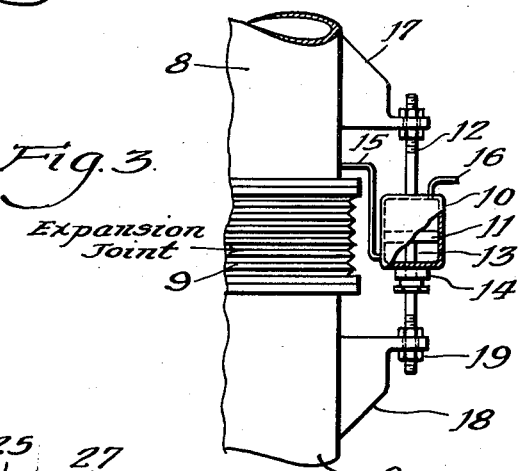
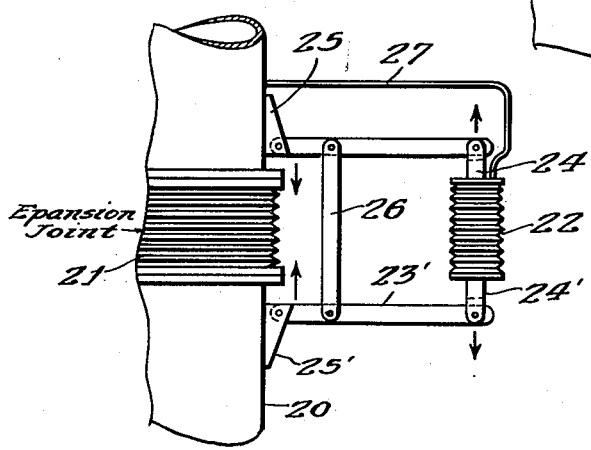
Inventor:
John Woods McCausland
By: Maynard P. Venema
Attorney Patented Mar. 20, 1951

2,545,701

UNITED STATES PATENT OFFICE 2,545,701

COMPENSATED PIPE EXPANSION JOINT

John Woods McCausland, Chicago, Ill., assignor to Universal Oil Products Company, Chicago, Ill., a corporation of Delaware Application November 29, 1946, Serial No. 713,181

1 Claim. (Cl. 285—90)

This invention relates to a method and apparatus for equalizing internal pressure thrusts on pipes or conduits having expansion joints therein. More specifically the invention provides means for opposing or counteracting internal pressure thrusts on conduits having expansion joints, whereby the internal fluid pressure of the medium within the conduit actuates other expansible and pressure operated thrust producing means, which in turn may be linked to the wall of the conduit to provide a counteracting force.

It is frequently necessary, because of elevated temperatures and resulting pipe expansions to provide pipes, ducts, and the like, with one or more expansion joints to accommodate the pipe growth or displacement. Expansion joints may be of either the slip-joint type or of the corrugated bellows-type, and they in turn may be of various designs and forms of construction, depending upon the longitudinal and horizontal displacement requirements. For example, the temperature, the magnitude of the internal pressure to be accommodated, and the internal fluid medium are all factors which will control the type and design of a particular expansion joint.

In a pipe, having an expansion joint therein and an internal pressure, either subatmospheric or superatmospheric, there is an internal pressure thrust exerted on the pipe. A positive pressure within a pipe provides a force which tends to open the expansion joint, while a vacuum operating condition effects the opposite result and the thrust tends to close the joint. The magnitude of this force, normally designated as the "end thrust," depends on the internal pressure and the size of the conduit, being numerically equal to the internal pressure multiplied by the transverse area of the expansion joint. In usual installations, the pipe or conduit must be anchored at suitable points to overcome this end thrust on the pipe and to hold the pipe in place. In many instances, the installation of a particular pipe is such that it is very difficult to provide these fixed anchorage points, while in still other cases, the magnitude of the end thrusts for large pipes may be very great and thereby require elaborate and expensive supporting structures.

It is a principal object of this invention to provide means for counteracting the internal pressure thrusts on a conduit, having an expansion joint therein, regardless of variations in the pressure within the pipe.

It is also an object of this invention to provide thrust equalizing apparatus which is linked to a conduit on each side of the expansion joint such that the end pressure thrusts are substantially counteracted and anchoring or constraining pipe support means may be substantially eliminated.

The thrust equalizing apparatus may comprise various forms; however, broadly, this invention comprises in combination, a fluid pressure actuated expansible thrust producing means, means supplying the fluid pressure of said conduit to said thrust producing means, linkage connecting said expansible thrust producing means to said conduit, with said linkage being constructed and arranged to apply a force to said conduit which counteracts the direct internal pressure thrusts on the conduit.

The movable thrust producing means itself, is preferably a bellows, a cylinder and piston, or the like, which is a pressure actuated device. In a preferable embodiment two or more bellows units are used in the thrust equalizing apparatus in order to simplify the mechanical linkage means and to more easily apply a uniform force externally to the conduit which substantially equals and opposes the internal pressure thrusts within the conduit. However, with suitable linkage or connecting means wherein a mechanical advantage is obtained, a single bellows or cylinder and piston unit may be used to substantially counteract the end thrust on a conduit.

Reference to the accompanying drawing and the following description thereof will serve to more clearly illustrate the construction and method of operation of various forms of the thrust equalizing apparatus.

Figure 1 of the drawing is an elevation view of a pipe having an expansion joint therein and one form of the thrust equalizing apparatus of this invention.

Figure 2 of the drawing is a sectional plan view through the conduit and the thrust equalizing device as indicated by line 2—2 of Figure 1.

Figure 3 of the drawing illustrates diagrammatically a second form of the thrust equalizing device.

Figure 4 of the drawing illustrates still another form of the thrust equalizing device with a special method for mounting the same which provides a mechanical advantage or lever action that permits the use of smaller thrust counteracting units.

Referring now to Figures 1 and 2 of the drawing, there is shown conduit 1 having mounted therein expansion joint 2. Spaced uniformly around the exterior of the conduit and expansion joint are a plurality of smaller expansible units 3, which in this embodiment are shown to be corrugated bellows type of expansible cylinders. Connecting between the conduit 1 and each of the bellows units 3 is an equalizing tube 4. Each of the tubes 4 supply a pressure to each of the bellows 3 which is substantially equal to the internal pressure within the conduit 1, thus, thrusts may be created within each of the thrust producing means which are proportional to the end thrust within the conduit. At each bellows unit 3, there is a pair of rods or yokes 5 and 5' that in turn connect with brackets 6 and 6'. The brackets 6 and 6' are attached to the conduit 1 with one set on one side of the expansion joint 2 and the other on the opposite side of the joint. Each of the yokes 5 connects between the lower ends of the bellows 3 and the upper brackets 6, while each of the yokes 5' connect between each of the upper ends of bellows 3 and the lower set of brackets 6'. Therefore, by this arrangement it may be seen that the bellows operate to counteract the internal pressure thrust which is imposed on the conduit 1 because of the expansion joint 2. By way of further explanation, when there is a superatmospheric pressure within conduit 1, the same pressure is provided at each of the bellows 3 and the pressure thrusts from each of the units 3 operates to pull the joint together with a force proportional to the pressure in the joint 2 which tends to push apart the separated portions of the conduit 1. It is of course necessary in this arrangement to space the bellows units uniformly around the conduit, and to provide a sufficient number of small bellows or small bellows area having a total transverse area equal to the transverse area of the expansion joint 2, when it is desired to provide an equalizing counteracting force.

The yoke members 5 and 5' are indicated as being connected to the brackets 6 and 6' by means of bolts 7, however, other forms of attachment may be used for connecting the the bellows members with the brackets 6 and 6'. Also, it is not intended to limit this invention to the form of yokes that are illustrated, for the form and design of yokes may be varied with the pressure and thrust requirements. Four bellows units 3 are indicated in Figures 1 and 2 of the drawing; however, two or more units may be used to effect a uniform counteracting thrust. Obviously, the greater the number of bellows units, the smaller they may be individually, to provide a total area substantially equal to that of the pipe expansion joint.

In Figure 3 of the drawing, there is shown diagrammatically a portion of a conduit 8, having an expansion joint 9, with accompanying thrust producing means of a somewhat different form. The thrust producing device comprises a cylinder 10, an internal sliding piston 11, a supporting rod 12 and a connecting rod 13 which connects with piston 11 and passes through the end of the cylinder 10. A packing gland 14 at the lower end of cylinder housing 10 provides means for passing the piston connecting rod 13 therethrough. An equalizing tube 15 is connected between the conduit 8 and the lower end of the cylinder housing 10 while an exhaust outlet 16 provides means for admitting or discharging air to the upper portion of the cylinder 10. The supporting rod 12 connects with the conduit 8 by means of a bracket 17 while the rod 13, connecting with movable piston 11, is attached to the conduit by means of the lower bracket 18. Each of the rods are connected with the brackets by means of bolts 19, or other suitable means of connection.

In the operation of the form of the equalizing device, the equalizing tube 15 supplies the pipe pressure to the lower end of the cylinder 10, below piston 11. Thus, each of the cylinders and pistons provide a force which counteracts the thrust on the conduit caused by the expansion joint. As indicated in Figures 1 and 2, a plurality of the piston and cylinder units equally spaced around the conduit 8 will provide a counteracting force which may be made to substantially equal the internal pressure thrust on the conduit, assuming that the total cross sectional area of the individual units is made equal to that of the transverse area through the expansion joint 9.

In Figure 4 of the drawing, there is shown still another form of the device wherein the connecting means to a conduit 20, having an expansion joint 21, provides a leverage action in opposing the internal pressure thrust on the pipe or conduit 20. Each of the expansible thrust producing units 22 are spaced from the conduit at a distance which is somewhat greater than that indicated in the previously described forms, such that a mechanical advantage may be obtained by the thrusts produced from each of the expansible units 22. Lever bars 23 and 23' connect opposite ends of the thrust producing unit with the conduit, by means of pivot supports 24 and 24' attached to the former, and brackets 25 and 25' attached to the latter. The brackets 25 and 25' are attached to the conduit 20 on opposite sides of the expansion joint 21. A fulcrum bar 26 connects between the two lever bars 23 and 23' and is pivotly connected thereto. Each of the lever bars are also pivotly connected at their respective ends to connecting brackets from the conduit and the connecting supports at the movable thrust producing units. As in other forms of the apparatus, an equalizing tube 27 supplies fluid pressure from the conduit to the inside of the bellows or other type of movable member 22. Thus, in operation, the units 22 will effect thrusts, which are proportional to variations in pressure within the conduit 20 and the mechanical linkage arrangement is such that a force is applied externally to the conduit at each of the individual units, which counteracts the internal pressure thrusts on the conduit due to the expansion joint 21. This particular form of the apparatus provides a method of reducing the size of each of the individual expansible units 22 since the fulcrum bar 26 may be located close to the pipe joint, at a point to provide a leverage action which if desired may effect a considerable mechanical advantage. In any particular thrust equalizing apparatus of this embodiment, the diameter of the thrust producing bellows or cylinder 22 will be calculated to take into account the mechanical advantage which is obtained by the leverage action.

It may be noted in reference to Figures 3 and 4 of the drawing, that while only a single thrust producing unit and linkage arrangement is shown for each, it is contemplated that two or more thrust producing units are to be provided for a preferable embodiment of a thrust equalizing apparatus in order that a substantially uniform counteracting force may be effected on each portion of the conduit to counteract the end thrust on the conduit from its internal pressure, or alternately, that a system of levers may be provided to transmit the thrust of a single thrust producing unit to the conduit at several spaced points around its periphery. Bellows or corrugated type expansion joints are indicated in each of the figures, however, it should be understood that the improved thrust equalizing apparatus of this invention is not limited to any particular form or type of expansion joint. Still further, it may be pointed out that this invention should not be limited to the exact forms of linkage and connections which have been illustrated, for obviously somewhat different forms of bracketing and linkage may be devised and be within the scope of this invention.

I claim as my invention:

A thrust equalizing apparatus for a conduit having an expansion joint therein, comprising in combination a bracket secured to said conduit on each side of said expansion joint, a substantially pressure tight piston and cylinder unit mounted between said brackets, a pressure supplying tube between said conduit and the cylinder of said unit, a rod-like connecting member between said cylinder and one of said brackets, and a second rod-like connecting member between the piston of said unit and the other of said brackets, said brackets and connecting members being linked to provide external forces on said conduit opposing the internal longitudinal pressure thrust on said conduit resulting from said expansion point.

JOHN WOODS McCAUSLAND.

REFERENCES CITED

The following references are of record in the file of this patent:

UNITED STATES PATENTS

| Number | Name | Date |
|---|---|---|
| 853,964 | Doolittle | May 21, 1907 |
| 853,974 | Hayden | May 21, 1907 |
| 2,314,776 | Dittus | Mar. 23, 1943 |
| 2,348,833 | Miller | May 16, 1944 |